Dec. 14, 1948.     J. W. MARSH     2,456,137
AIR BRAKE APPARATUS
Filed Oct. 30, 1946
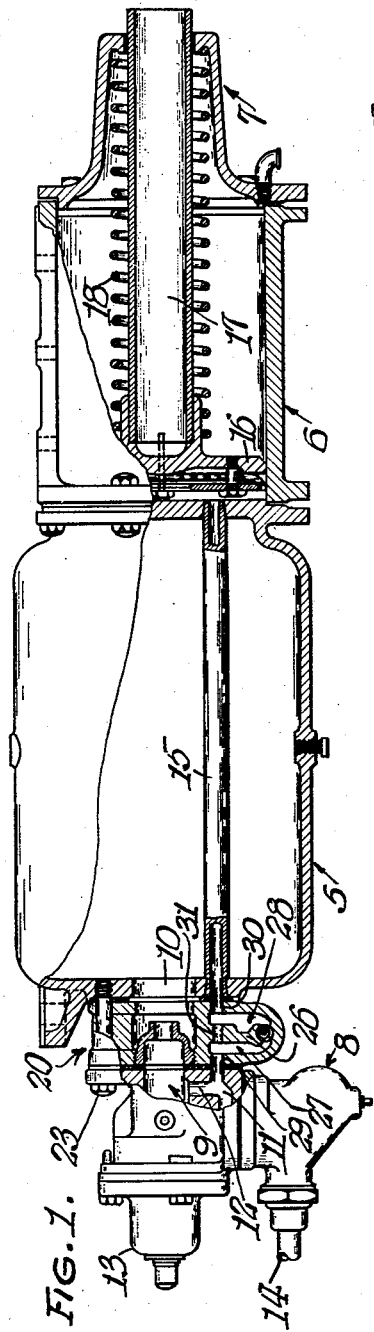
Inventor
John W. Marsh
By Arthur W. Nelson
Attorney Patented Dec. 14, 1948

2,456,137

UNITED STATES PATENT OFFICE 2,456,137

AIR BRAKE APPARATUS

John W. Marsh, Arlington, Va., assignor to Apex Railway Products Co., Chicago, Ill., a corporation of Delaware Application October 30, 1946, Serial No. 706,656

5 Claims. (Cl. 303—84)

This invention relates to improvements in air brake apparatus and it consists of the matters hereinafter described and more particularly pointed out in the appended claims. Especially it relates to the controlling or timing of the periods of application and release of the brakes.

With conventional air brake apparatus, the time periods of application and release of the brakes are controlled by the size or area of the port connections between the triple valve, the auxiliary air reservoir and the brake cylinder thereof. In such apparatus, the port connections mentioned provide an application time period of the brakes of approximately three seconds between the occurrence of reduction of pressure in the train line and the full movement of the brake cylinder piston, and a release time period of approximately seven seconds between the occurrence of restoration of train line pressure and release of brake cylinder pressure.

Under certain conditions of train operations, these time periods are too fast or short and produce shocks in the train, due to lack of uniformity of application and release of brakes throughout the train. These shocks often result in broken couplings and excessive buffing loads and damage to the cars and the contents thereof.

One of the objects of the present invention is to provide simple and efficient means to selectively change the time periods of brake application and release from the faster ones mentioned to slower ones and back to said faster ones as train operating conditions may require, and thereby obtain a more uniform application and release of brakes throughout the train, and thus eliminate the shocks above mentioned and the damage produced thereby, with a considerable saving in service operation on the cars in train.

Another object of the invention is to provide means of the kind mentioned which may be readily built into new air brake apparatus, or may be readily applied to apparatus already in service, at a minimum of expense.

A further object of the invention is to provide means of the kind mentioned which may be disposed between the triple valve and the auxiliary air reservoir in air brake apparatus now in service.

The above mentioned objects of the invention, as well as others, along with the advantages thereof will more fully appear as the specification proceeds.

In the drawing:

Fig. 1 is a view partly in elevation and partly in section of the triple valve, the auxiliary air reservoir and the brake cylinder of an air brake apparatus, to which the present invention has been applied.

Fig. 2 is a view, on an enlarged scale, partly in front elevation and partly in section, of a member or unit embodying one form of the invention and adapted to be disposed between the triple valve and the auxiliary air reservoir of an air brake apparatus.

Fig. 3 is a view in side elevation of the member shown in and on the scale of Fig. 2 when viewed from the right hand side thereof, a portion of said member being shown as broken away, better to show a certain orifice or port that will be mentioned later.

Fig. 4 is a detail sectional view through a part of the member appearing in Fig. 2, as taken on the line 4—4 thereof.

As the invention is especially concerned with, and operatively affects only the triple valve, the auxiliary air reservoir and the brake cylinder, only these parts are illustrated in the drawings.

In general, the invention relates to means whereby to selectively change from one time period of application and release of the brakes to another and which means may be built into the triple valve of new brake equipment or it may be provided in a separate unit adapted to be inserted between the triple valve and associated end of the auxiliary air reservoir in equipment now in use. In the present instance, the invention is illustrated and will be herein described as embodied in a unit adapted for cooperation with brake equipment now in use.

Referring now in detail to that embodiment of the invention illustrated in the drawings, 5 indicates, as a whole, a conventional type of auxiliary air reservoir, to the closed end of which is operatively secured one end of a brake cylinder 6, the other end of which has secured thereto a non-pressure head 7. A conventional type of triple valve is indicated at 8, and in equipment in service this valve is usually bolted to that end of the auxiliary air cylinder opposite the end with which the brake cylinder is associated.

The body of this valve contains a valve chamber 9 that is arranged for alignment with a port 10 of large area in the associated end of the reservoir. The brake cylinder air passageway is indicated at 11 and opens in parallel relation through the associated end of the body and is connected to the port 10 by a lateral port 12. The cap of the valve is indicated at 13, and 14 indicates the brake pipe.

Extending longitudinally through the auxiliary air reservoir is the pipe or tube 15 that provides for the passage of air from the triple valve to the brake cylinder. This pipe is fixed at its ends in the ends of the reservoir, and one end of said pipe opens into the associated end of the brake cylinder, while the other end opens in line with the passage 11 in the valve. In the brake cylinder is a piston 16 having a tubular piston rod 17 that slides through the head 7, and surrounding that part of said rod between the piston and said head is the return spring 18 for the piston. The parts described are parts of a conventional type of air brake apparatus, many of which are in service. However, as before mentioned, the parts mentioned provide an operation of the associated parts of the apparatus which under certain train operating conditions is too fast in the time period of application and too short or fast in the time period of release of the brakes.

To select that time period of brake application and release most suitable for the operation of the train, I provide a unit 20 which is interposed between the triple valve 8 and the reservoir 5, as shown in Fig. 1. Said unit includes a short cylindrical body having a central longitudinal passage 21 to receive a projecting part of the triple valve. Outwardly from said passage are openings 22 so arranged as to register with the openings in the valve body and reservoir respectively, and permit the passage of bolts 23 (only one of which appears in Fig. 1) and whereby the valve and the unit are operatively attached to the reservoir 5. When the parts have thus been attached together, the passage 21 lines up with the chamber 9 in the triple valve 8 and the opening 10 in the associated end of the reservoir, and affords the communication of air between said chamber and said reservoir.

The unit 20 is provided at one side with a lateral hollow extension 24 (see Figs. 2 and 3), a part 25 of which projects outwardly beyond the body of said unit. This hollow extension is provided with a partition 26 which divides the extension into chambers 27 and 28 respectively, the partition extending to the part 25 of the unit. In that end of the unit are ports 29 and 30 respectively, which register with the port 11 in the valve and the pipe 15 in the reservoir, and in the partition 26 is an orifice 31 of relatively small dimension. Thus, it will be seen that the port 11 communicates with the chamber 27 and the chamber 28 communicates with the pipe 15. The orifice 31 is provided by means of a suitable plug 32 which is of a diameter smaller than that of the ports 29 and 30 to permit its application in the partition.

In the extension part 25 is located a tapering valve port 33, in which is a valve bushing 34 and this bushing is provided in its opposite sides with ports 35 and 36 respectively (see Fig. 4), which communicate with the chambers 27 and 28 respectively.

A tapered valve plug 37 is rotatably mounted in the bushing, and a plug and spring assembly 38 (see Fig. 2) associated with the larger diameter end of the valve plug provides a good tight fit therefor in the bushing. In the valve plug is a cross port 39 (see Fig. 4) which in the turning of the valve plug from one stop position to the other is adapted to move into and out of registration with the ports in the bushing. The smaller diameter end of the valve plug projects outwardly beyond the associated extension part 25 to receive a lever 40 by which the plug may be turned in the bushing 34 from one stop position to the other and back to the first one. These stop positions may be afforded by pins or shoulders 41—42 on said part 25 and associated therewith are the letters "S" and "F" (see Fig. 2) which denote the time periods for brake operations, i. e. "Slow" or "Fast."

The ports 35 and 36 in the bushing 34 and plug 37 respectively, provide when lined up and in communication with each other, a normal port area between the chambers 27 and 28, while the orifice 31 provides the restricted port area between said chambers.

When the valve plug is in its open position, wherein the lever 40 engages the stop 41 as in Fig. 3, its ports 39 registers with the ports in the bushing 34, the passage of air between the triple valve and the brake cylinder is normal and provides quick application and release of the brake since the air at that time may pass in part through orifice 31 and also through port 39 of member 37. When said valve has been turned to its closed position, wherein the lever 40 engages the stop 42, its port 39 is out of register with those in the bushing. In this position of the plug 37, the air connection between the triple valve and the brake cylinder is only through the restricted orifice 31 and this provides a slow time period of application and of release for the brakes. The desired size orifice 31 can be provided by inserting a plug 32 having the correct size orifice therein. The valve lever 40 is operable from either side of the car, and the stop pins 41 and 42 have marks associated therewith to indicate the slow and the fast brake operations as before mentioned.

The orifice 31 is open at all times but being restricted, has no effect when the valve plug 37 is opened to that position providing the fast application and release of brakes.

Thus by means of the structure described, when conditions are such that fast application and release of brakes is advisable, this may be provided by turning the lever 40 to that position indicating the same. When conditions are such that slow application and release of brakes is advisable, this condition may be provided by turning said lever to that position indicating the same.

Thus by the means described, it is possible to provide in an air brake apparatus, simple and efficient means whereby either a fast or a slow application and release of brakes may be afforded as the conditions may warrant.

While in describing the invention, I have referred in detail to the form, arrangement and construction of the parts involved, the same is to be considered only in the illustrative sense and therefore I do not wish to be limited thereto except as may be specifically set forth in the appended claims.

I claim as my invention:

1. Air brake apparatus embodying therein a triple valve having an air port, a brake cylinder spaced therefrom, an auxiliary air reservoir between said valve and said cylinder and operatively connected at one end to said cylinder, means providing a conduit through said reservoir and opening at one end into said cylinder, a member disposed between the other end of said reservoir and said valve and formed for the passage of air therebetween, said member being further formed at its ends with ports for the passage of air between the air port of said valve and said conduit through said reservoir, said member also being formed to provide passageways affording communication between said ports therein and a manually operable valve for closing off the passage of air through one of the passageways in said member without affecting the passage of air through the remainder of said passageways in said member.

2. Air brake apparatus embodying therein a triple valve having an air port, a brake cylinder spaced therefrom, an auxiliary air reservoir between said valve and said cylinder and operatively connected at one end to said cylinder, means providing a conduit through said reservoir and opening at one end into said cylinder, a member disposed between the other end of said reservoir and said valve and formed for the passage of air therebetween, said member being further formed at its ends with ports for the passage of air between the air port of said valve and said conduit through said reservoir, said member also being formed to provide passageway affording communication between said ports therein, one of said passageways having a relatively large area and the other of said passageways having a smaller area, and a manually operable valve for closing off the passage of air through said passageway of relatively large area, without affecting the passage of air through the other passageways.

3. In air brake apparatus including a triple valve and an auxiliary air reservoir, a member adapted to be disposed between and secured to said triple valve and said auxiliary air reservoir, said member embodying therein an annular body having a main passageway therethrough, hollow means extending laterally from said body and providing chambers separated by a partition, there being a port opening through each end of the body parallel with said main passageway for each chamber, said partition having passageways therethrough affording communication between said chambers, and a manually operable valve for closing off the passage of air through one of said passageways without affecting the passage of air through the remainder of said passageways.

4. In air brake apparatus including a triple valve and an auxiliary air reservoir, a member adapted to be disposed between and secured to said triple valve and said auxiliary air reservoir, said member embodying therein an annular body having a main passageway therethrough, hollow means extending laterally from said body and providing end chambers separated by a partition, there being a port opening through each end of the body parallel with said main passageway for each chamber, said partition having passageways therethrough affording communication between said chambers, one of said passageways having a relatively large area and the other of said passageways having a smaller area and a manually operable valve for closing off the passage of air through said passageway of relatively large area without affecting the passage of air through the other passageways.

5. In air brake apparatus including a triple valve and an auxiliary air chamber, a member adapted to be disposed between and secured to said triple valve and said auxiliary air reservoir, said member embodying therein a relatively flat ended annular body having a main air passageway therethrough, hollow means extending laterally from said body and including a part extending laterally beyond said body, said hollow means being formed to provide end chambers separated by a partition, there being a port opening through each end of the body parallel with the main passageway for each chamber, means providing a bushing in said partition arranged parallel with said ports that open through the ends of said body and which bushing has an orifice therein connecting said chambers, that part of said hollow means extending outwardly from said body having a valve plug therein operable to connect or disconnect said chambers and arranged at an angle to said main passageway.

JOHN W. MARSH.

REFERENCES CITED

The following references are of record in the file of this patent:

UNITED STATES PATENTS

| Number | Name | Date |
| --- | --- | --- |
| 1,081,325 | Opperman | Dec. 16, 1913 |
| 1,860,406 | Chevillot et al. | May 31, 1932 |
| 2,027,469 | Campbell et al. | Jan. 14, 1936 |